United States Patent [19]
Raffel et al.

[11] Patent Number: 5,610,703
[45] Date of Patent: Mar. 11, 1997

[54] METHOD FOR CONTACTLESS MEASUREMENT OF THREE DIMENSIONAL FLOW VELOCITIES

[75] Inventors: Markus Raffel, Göttingen; Jürgen Kompenhans, Gleichen; Hans Höfer, Göttingen, all of Germany

[73] Assignee: Deutsche Forschungsanstalt Fur Luft-und Raumfahrt e.V., Bonn, Germany

[21] Appl. No.: 380,966

[22] Filed: Jan. 31, 1995

[30] Foreign Application Priority Data

Feb. 1, 1994 [DE] Germany ................ 44 02 957.8

[51] Int. Cl.⁶ .................. G01P 3/36; G01F 1/712
[52] U.S. Cl. .................. 356/28; 73/861.06; 364/510
[58] Field of Search ................. 356/28; 364/510; 73/861.06

[56] References Cited

U.S. PATENT DOCUMENTS

| | | | |
|---|---|---|---|
| 4,866,639 | 9/1989 | Adrian | 73/861.06 |
| 5,011,278 | 4/1991 | Farrell | 356/28 |
| 5,424,824 | 6/1995 | Daiber et al. | 356/28.5 |
| 5,469,250 | 11/1995 | Holmes | 356/28 |
| 5,491,642 | 2/1996 | Wormell et al. | 364/510 |

*Primary Examiner*—Stephen C. Buczinski
*Attorney, Agent, or Firm*—Thomas, Kayden, Horstemeyer & Risley

[57] ABSTRACT

A digital particle image velovimetry (DPIV) method for contactless measurement of three dimensional flow velocities comprising the steps of seeding a flow with tracer particles; repeatedly illuminating a plane-like interrogation volume of the seeded flow; projecting the repeatedly illuminated interrogation volume onto at least a photo sensor in a projection direction for recording pictures of the illuminated interrogation volume; and determining the three dimensional flow velocities from the pictures of the repeatedly illuminated interrogation volume recorded by the photo sensor. The plane-like interrogation volume of the invention comprises at least two partial volumes positioned parallelly parallel to each other with regard to the projection direction. The step of repeatedly illuminating the interrogation volume comprises the step of illuminating the partial volumes in such a way that the pictures of different partial volumes are distinguishable from each other. The step of determing the three dimensional flow velocities of the flow comprises the steps of calculating a local autocorrelation function of a double exposed picture of the same partial volume, or calculating a local cross-correlation function between two separate pictures of the same partial volume, calculating a local cross-correlation function between two pictures of two different partial volumes, determining the sign of the out-of-plane component of the local flow velocities by using the location of a peak of the local cross-correlation function between the two pictures of the two different partial volumes, and determining the magnitude of the out-of-plane component of the local flow velocities by using the peak heights of peaks of both local correlation functions.

18 Claims, 9 Drawing Sheets

$t = t_0$ $t = t_0 + \Delta t$

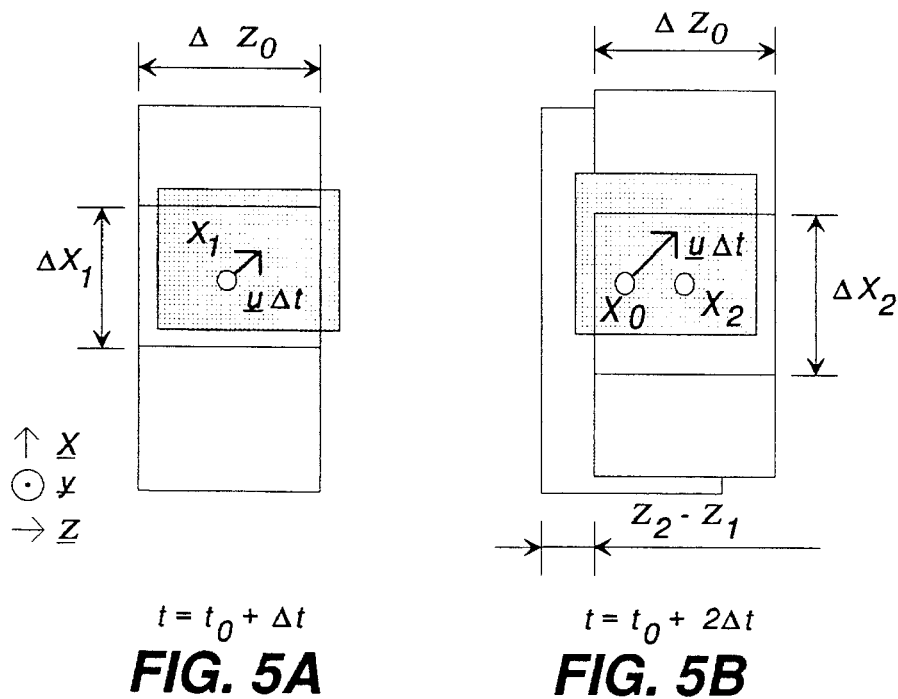
FIG. 5A  $t = t_0 + \Delta t$
FIG. 5B  $t = t_0 + 2\Delta t$
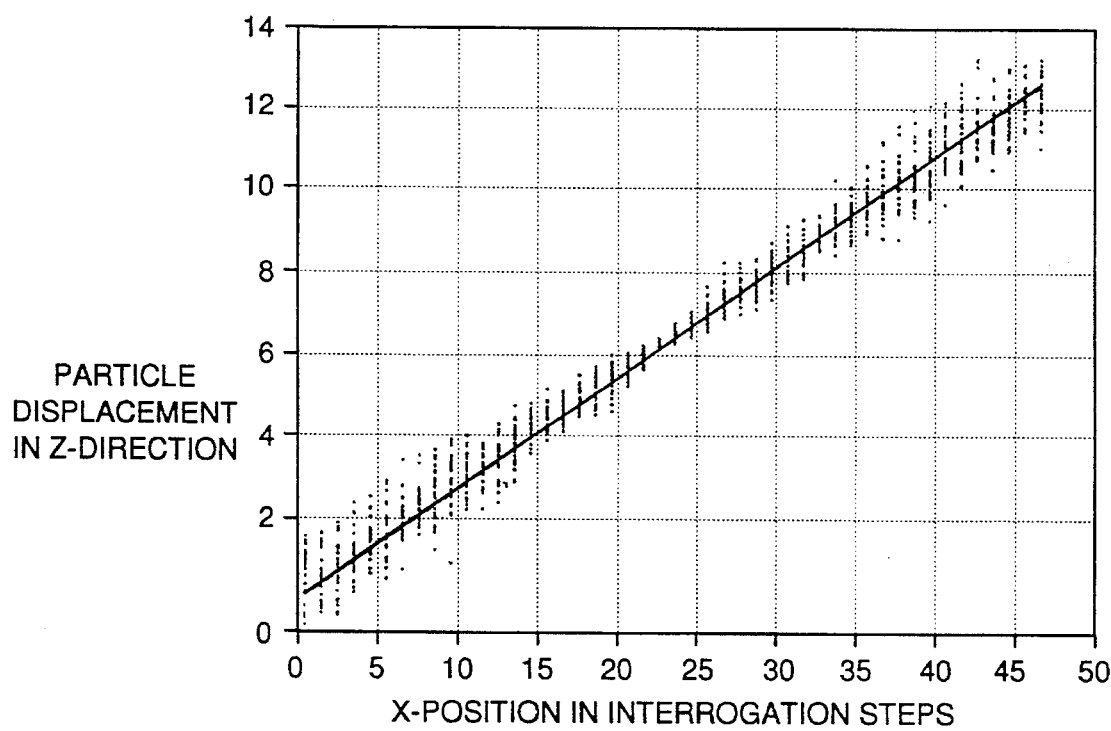
FIG. 6

METHOD FOR CONTACTLESS MEASUREMENT OF THREE DIMENSIONAL FLOW VELOCITIES

FIELD OF THE INVENTION

The invention relates to a method for contactless measurement of three dimensional flow velocities comprising the steps of seeding a flow with tracer particles; repeatedly illuminating a plane-like interrogation volume of the seeded flow; projecting the repeatedly illuminated interrogation volume onto a photo sensor in a projection direction for recording pictures of the illuminated interrogation volume; and determining the three dimensional flow velocities from the pictures of the repeatedly illuminated interrogation volume recorded by the photo sensor. This method is known as particle-image-velocimetry abbreviated as PIV, or as multiple light-sheet technique.

BACKGROUND OF THE INVENTION

In PIV the distance which the tracer particles have covered between the illuminations of the interrogation volume is used as a measure of the velocities of the tracer particles in the interrogation volume. By this a double problem is caused. At first, the sign of the flow velocities of the single tracer particles does not result from the multiple exposed pictures of the interrogation volume without some qualification. At second, the velocity components perpendicular to the main extension directions of the interrogation volume which is the so called out-of-plane component can also not be determined without some qualification.

In a known PIV method the interrogation volume is projected stereoscopically on two photo sensors, i. e. in two different projection directions, for recording a double exposed picture of the interrogation volume with each photo sensor. Both double exposed pictures together cover the flow velocities of the tracer particles in all three dimensions. In the method, the determination of the sign of the flow velocity is enabled in that between the two illuminations the interrogation volume is shifted relative to the photo sensors in such a way that a particle image shift on the photo sensors bigger than the maximum particle image shift corresponding to the flow is caused. By this way particle image shifts of only one sign necessarily result in the double exposed pictures of the interrogation volume, and both the magnitude and the sign of the flow velocities can be determined by forming a difference to the artificial shift of the interrogation volume relative to the photo sensors. Such a known PIV method is disclosed in German Patent 42 37 440, for example. This method requires a considerable apparatus expenditure for implementation. The projection optic must comprise two objectives arranged at an angle and two particle image shifting means corresponding to each other, i. e. synchronized with each other. Nevertheless, the resolution of the flow velocities perpendicular to the main extension directions of the interrogation volume is low, because only a comparatively small angle between both projection means of the stereoscopic arrangement can be selected.

In a further known PIV method the interrogation volume is repeatedly illuminated and recorded holographically. For this a photo sensor in the form of a special film is used. However, films usable for taking holographic pictures have the drawback of a low photosensivity. So only the capture of small survey fields and of low flow velocities is possible. Additionally, in a holographic technique an artificial shift of the interrogation volume relative to the photo sensor between the two illuminations of the interrogation volume can also not be avoided, if the sign of the flow velocities of the tracer particles is to be determined. This results in a considerable apparatus expenditure besides the holographic projection arrangement.

More particularly the invention is related to a method known as digital particle image velocimetry abbreviated as DPIV.

Normally in DPIV two pictures of the same interrogation volume are recorded separately and the pictures are evaluated statistically. Liepmann et al. teach in "The role of streamwise vorticity in the near field entrainment of round jets" (Journal of Fluid Mechanics, Vol. 245 (1992), pp. 643–668) to calculate a cross-correlation function between the two pictures recorded at an interval of time and to interpret the peak height of the cross-correlation peak as a qualitative measure for the out-of-plane component of the flow.

SUMMARY OF THE INVENTION

The present invention provides a method for contactless measurement of the exact magnitude and sign of three dimensional flow velocities which requires a reduced apparatus expenditure and in which an artificial shift of the interrogation volume relative to the photo sensors between the illumination of the interrogation volume can be avoided.

According to the invention the plane-like interrogation volume comprises at least two partial volumes arranged parallel to each other with regard to the projection direction; the step of repeatedly illuminating the interrogation volume comprises the step of illuminating the partial volumes in such a way that the pictures of different partial volumes are distinguishable from each other; and the step of determining the three dimensional flow velocities of the flow comprises the steps of calculating a local autocorrelation function of a double exposed picture of the same partial volume, or calculating a local cross-correlation function between two separate pictures of the same partial volume, calculating a local cross-correlation function between two pictures of two different partial volumes, determining the sign of the out-of-plane component of the local flow velocities by using the location of a peak of the local cross-correlation function between the two pictures of the two different partial volumes, and determining the magnitude of the out-of-plane component of the local flow velocities by using the peak heights of peaks of both local correlation functions.

In the invention the photo sensor or two or more photo sensors record the partial volumes arranged one behind each other separately from each other. By that the application of statistical methods, i. e. the calculation of the local cross- or autocorrelation functions, results in the possibility to determine both the magnitude and the sign of the flow velocities perpendicular to the main extension directions of the interrogation volume.

The pictures of different partial volumes may be distinguishable chronologically from each other. To achieve this different partial volumes are illuminated at different points of time in the step of illuminating the partial volumes, and the pictures of the different partial volumes are recorded separately one after each other in the step of projecting the survey volume onto the photo sensor.

Carrying out the invention, a first partial volume may be illuminated twice at a first interval of time, and a second partial volume may be illuminated within a second interval of time before or after one of the illuminations of the first partial volume, wherein the second interval is small in relation to the first interval of time.

If the pictures of different partial volumes are to be distinguished chronologically from each other, separate photo sensors each synchronized with one illumination of one partial volume may be used in the step of projecting the interrogation volume.

Alternatively, different kinds of light distinguishable from each other may be used for illuminating different partial volumes in the step of illuminating the partial volumes. The kinds of light may be distinguishable from each other with regard to their polarization or color, for example. Depending on the optical property by which the kinds of light are distinguishable the photo sensors may be one structural unit. For example, a video chip being able to register different kinds of light independently but simultaneously is conceivable. Instead of this, separate photo sensors selectively sensible for one of the kinds of light may be used in the step of projecting the interrogation volume onto the photo sensors.

In a statistical evaluation of the two double exposures it is useful that both partial volumes are of equal size to ensure that the projections of the tracer particles on both photo sensors have the same weight.

For obtaining a particularly meaningful cross-correlation function of the two multiple exposed pictures it is desirable that the partial volumes of the interrogation volume overlap partially, i. e. the partial volumes of the interrogation volume do not just extend over different regions of the interrogation volume, even though they each cover a part of the interrogation volume not included in the other partial volume or the other partial volumes, respectively.

Particularly good evaluation conditions are given if the partial volumes of the interrogation volume overlap each other by about 50% of their extension perpendicular to their main extension directions.

A device for carrying out the method according to the invention is characterized in that an illumination means illuminates at least two parallel partial volumes of the plane-like interrogation volume which are arranged one behind each other with respect to the projection direction with kinds of light distinguishable from each other, and that the photo sensor is intended for the registration of the kinds of light separately from each other. The possibility of determining both the magnitude and the sign of the flow velocities perpendicular to the main extension directions of the interrogation volume results from dividing up the interrogation volume into at least two parallel partial volumes. Doing this a simple projection means is sufficient and a means for artificially shifting the interrogation volume relative to the photo sensors can be avoided totally.

A suitable illumination means comprises a pulsed laser having two separate oscillators of different polarization direction or a pulsed laser and a polarization beam splitter. In the latter case the projection optic comprises a polarization beam splitter for the separation of the two polarization directions. In this context also a conventional beam splitter combined with a polarization filter for each photo sensor is covered by the term polarization beam splitter. Further, the principle of the applied beam splitter, semi-reflecting mirror or beam-splitting prism for example, is irrelevant.

Instead, the illumination means may comprise at least two pulsed lasers each of which is synchronized with one photo sensor wherein the projection optic comprises a beam splitter. This arrangement is suitable for distinguishing the kinds of light chronographically. In this arrangement a high speed camera known from German Patent 42 12 271 can be used as a projection optic.

The invention will be further illustrated and described with reference to exemplary embodiments as follows.

BRIEF DESCRIPTION OF THE DRAWINGS

FIGS. 5a and 5b show the size and location of the interrogation volume and position of the particles illuminated b y the first light pulse at the time of the second (a) and a third (b) exposure.

FIG. 6 shows an evaluation of computer generated images.

DETAILED DESCRIPTION OF THE PREFERRED EMBODIMENTS

Figure 1:
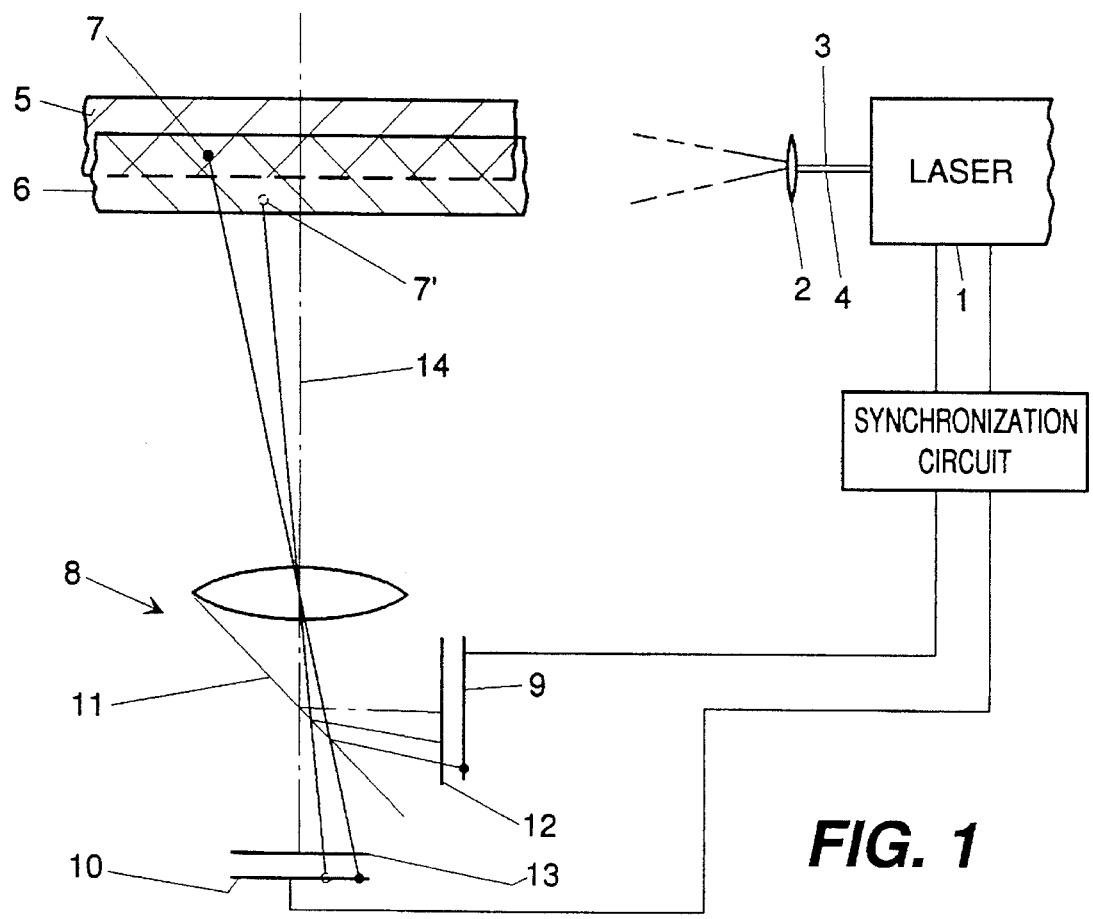
FIG. 1 shows a first embodiment of a device for contactless measurement of three dimensional flow velocities.

The device shown in FIG. 1 comprises a pulsed laser 1 which is combined with a light sheet optic 2. The pulsed laser 1 is a pulsed laser with two separately constructed oscillators of different polarization in a conventional arrangement. Correspondingly, the pulsed laser emits two laser beams 3, 4 having different polarization directions. From the laser beams 3 and 4 the light sheet optic 2 forms two partially overlapping, parallel bundles of beams each illuminating a partial volume 5 or 6 of a interrogation volume 5, 6. The interrogation volume 5, 6 lies within the area of the flow the three dimensional flow velocities of which are measured with the device shown. The partial volumes 5 and 6 have a plane-like extension with a small expanse perpendicular to their main extension directions. The two partial volumes 5 and 6 are of equal size and overlap each other by about 50%. The flow which itself is not depicted in FIG. 1 is seeded with tracer particles to make its flow velocities visible. One illustrative tracer particle 7 is depicted. The tracer particles are to be selected in such a way that they are carried along the flow without friction so that they have the velocity of the surrounding flow. For projection of the interrogation volume 5, 6 and the tracer particles included therein, respectively, there is provided a projection optic 8. The projection optic 8 projects the interrogation volume 5, 6 onto two photo sensors 9 and 10 which are customary spatially high resoluting video chips. The optical axis 14 of the projection optic 8 is arranged perpendicular to the main extension directions of the partial volumes 5 and 6. This means on the other side that the partial volumes are arranged one behind each other in the projection direction of the projection optic 8. For projecting the interrogation volume onto both photo sensors 9 and 10 in the same way the projection optic 8 comprises a beam splitter 11. Between the beam splitter and each photo sensor 9 and 11 there is provided a polarization filter 12 and 13, respectively. The transmission directions of the polarization filters 12 and 13 are orientated in such a way that photo sensor 9 is only reached by the light with which the pulsed laser illuminates partial volume 5, while photo sensor 10 is only reached by the light with which the pulsed laser illuminates partial volume 6.

For determination of flow velocities within the interrogation volume 5, 6 the partial volumes 5 and 6 are illuminated simultaneously two times at intervals with the aid of the pulsed laser 1. From this a double exposed picture of the partial volume 5 on photo sensor 9 and a double exposed picture of the partial volume 6 on photo sensor 10 result.

Between the two illuminations of the partial volumes 5 and 6 the tracer particle 7 has moved to the position 7' shown in broken lines. Doing this it has left the partial volume 5. Within the partial volume 6 it has been situated during both the first and the second illumination. From this it is possible to infer the magnitude and the sign of the flow velocity of the tracer particle 7 in the direction of the optical axis 14 by detecting the course of the image of the tracer particle 7 in the double exposed pictures.

Figure 2:
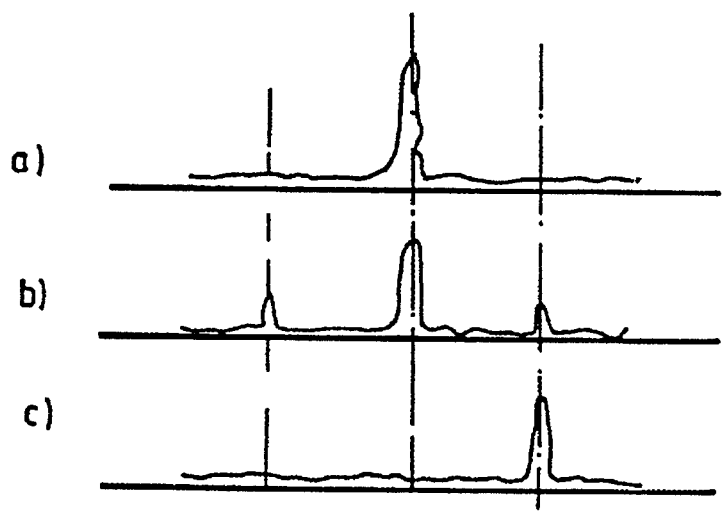
FIGS. 2a and 2b show profiles of auto correlation planes.
FIG. 2c shows a profile of an cross-correlation plane, the corresponding correlation functions being calculated between pictures recorded with the device according to FIG. 1.

The statistical evaluation of the two double exposed pictures of the partial volumes 5 and 6 on the photo sensors 9 and 10 is sketched in FIG. 2. FIG. 2a shows a profile of the autocorrelation plane of the double exposed picture of the partial volume 5; FIG. 2b shows a profile of the corresponding autocorrelation plane belonging to partial volume 6; and FIG. 2c shows a profile of the cross-correlation plane between the two double exposed pictures. While the profiles of both autocorrelation planes are symmetrical, the profile of the cross-correlation plane in FIG. 2c shows that the tracer particles move often from partial volume 5 into partial volume 6. By this the sign of the flow velocity perpendicular to the main extension directions of the partial volumes is determined. From the profile of the cross-correlation plane the velocity in direction of the optical axis according to FIG. 1 can also be determined quantitatively.

The statistical method described at last is in particular suitable for measurements of flow velocities of flows being seeded with a large number of tracer particles. This high density of tracer particles and the use of the correlation calculation allows a high resolution of the components of the flow velocities perpendicular to the main extension directions of the interrogation volume, i.e. parallel to the optical axis 14.

In the following the theoretical background of the method according to the invention and the results of a measurement experiment are explained by the inventors.

Figure 3A:
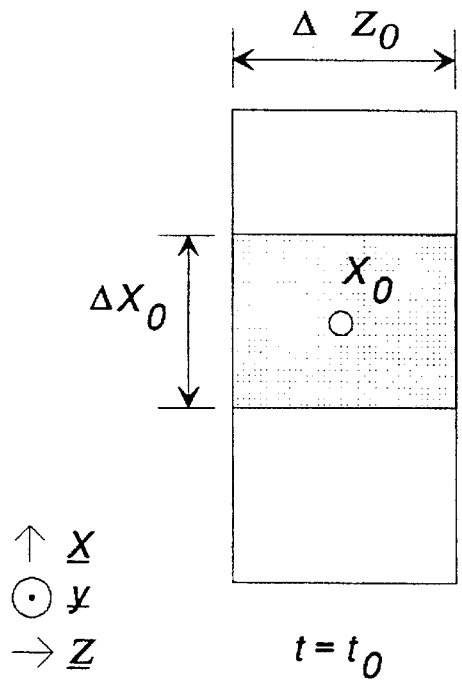
FIGS. 3a and 3b show a sketch of particles moving through a light sheet at two different times.
Figure 3B:
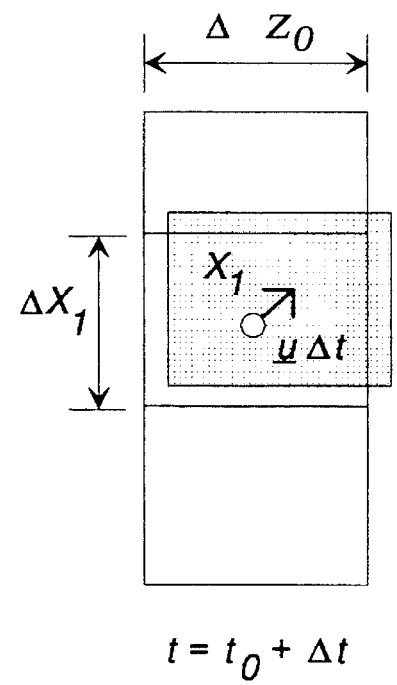

When dealing with a sufficient number of particle images in the measurement volume (see FIG. 3 ), the number of particle-image pairs per interrogation cell can be used to estimate the out-of-plane flow component. This number is proportional to the number of particles within the measurement volume $n_0$ during the first exposure (see FIG. 3a), decreased by the number of second images that leave this volume due to out-of-plane motions and by the number lost by in-plane motion. Using evaluation methods with a constant size and fixed location of the interrogation window, and assuming a constant particle density C, the number of lost particle image pairs is proportional to the hatched volume shown in FIG. 3b.

The number of particles within the measurement volume at location $x_0$ during the first exposure can be calculated as:

$$n_0 = C \cdot \Delta x_0 \cdot \Delta y_0 \cdot \Delta z_0, \quad (1)$$

with C=constant.

Figure 4A:
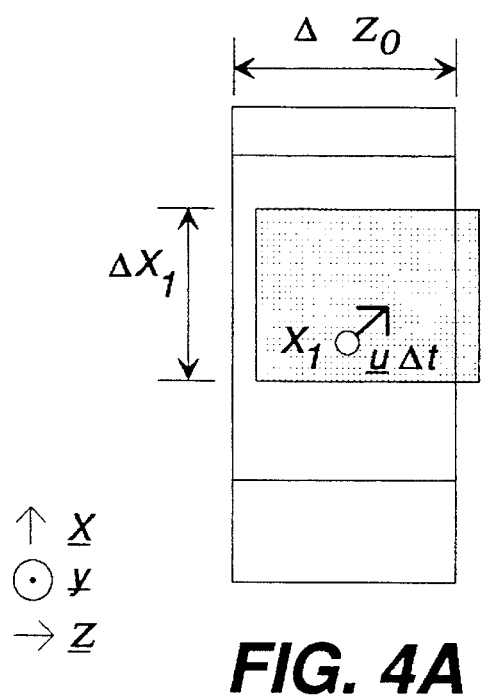
FIGS. 4a and 4b show the size and location of the interrogation volume and position of the particles illuminated by the first light pulse at the time of the second exposure.
Figure 4B:
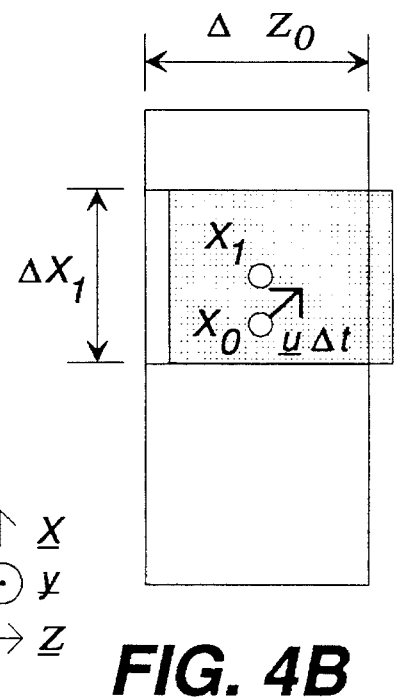

Two different methods can be used to circumvent the loss of particle image pairs resulting from the in-plane velocity components u and v. The loss of image pairs can be eliminated by using different sizes of interrogation windows $\Delta x_{0,1}$, $\Delta y_{0,1}$ and $\Delta x_{0,2}$, $\Delta y_{0,2}$, and identical locations of the interrogation window centers (see FIG. 4a). It is also possible to use an identical size of interrogation windows centered at $x_0$ and $x_1$ (see FIG. 4 b). The centers are displaced by the mean particle image displacement of the observed area.

Either method and their combinations can be used to reduce the loss of particle image pairs to the fraction caused by the out-of-plane velocity component w. This fact can be applied for a later improvement of the technique. In our experiments, we first captured images of tracer particles within a single light sheet plane on two separate frames $f_0$ and $f_1$ (see FIG. 5a). The time separation between both exposures is denoted by $\Delta t$. In addition, after a delay of $\Delta t$ images of tracer particles, illuminated by a second light sheet parallel to the first one, were captured on a third frame $f_2$ (see FIG. 5b). The second light sheet was displaced in the direction of the largest out-of-plane components by a distance of $(z_2-z_1)$. This distance was chosen to be smaller than the light sheet thickness $\Delta z_0$. This resulted in an overlap $O_z = 1 - (z_2-z_1)/\Delta z_0$ between the two light sheets in z-direction.

This procedure has the following advantages: (1) the influence of the loss of image pairs due to the in-plane velocity components can be reduced; (2) the ambiguity of the sign of the out-of-plane velocity component can be removed, (3) a larger out-of-plane velocity component can be tolerated; and (4) a better signal-to-noise ratio can be achieved.

Assuming that the out-of plane particle motion war is positive and always smaller than the light sheet thickness $\Delta z_0$, and that the intensity distribution in the light sheet is constant, the number of matched particle images, which can be detected within the separate recordings ($f_0$ and $f_1$) can be calculated as:

$$n_{0,1} = C \cdot \Delta x \cdot \Delta y \cdot (\Delta z_0 - w \Delta t), \quad (2)$$

if $0 \leq w \Delta t \leq \Delta z_0$.

Within the limits given below, the number of particle image pairs within the separate recordings of the second and third exposure $f_1$ and $f_2$ can be calculated as:

$$n_{1,2} = C \cdot \Delta x \cdot \Delta y \cdot (O_z \Delta z_0 + w \Delta t), \quad (3)$$

if $-O_z \Delta z_0 \leq w \Delta t \leq (z_2 - z_1)$.

Combining equation (2) and (3), the following formula for the estimation of the out-of-plane velocity component can be obtained:

$$w = \frac{\Delta z_0}{\Delta t} \frac{n_{1,2} - O_z n_{0,1}}{n_{1,2} + n_{0,1}}, \quad \text{if } 0 \leq w \Delta t \leq (z_2 - z_1). \quad (4)$$

It must be mentioned that the equations (1), (2) and (3) can be combined in different ways. Furthermore, it must be kept in mind, that the exact numbers for $n_{0,1}$ and $n_{1,2}$ cannot be calculated. They can only be estimated with an certain error. We decided to use the combination yielding equation (4) for our evaluation. This decision was based on the assumption that the main sources of errors can be modeled as factors contained is the calculated estimators. Identical factors contained in the estimation of $n_{0,1}$ and $n_{1,2}$ are eliminated when using equation (4). The error sources contained in the estimators are described in the following section.

In this section, the analysis of the frequency of particle image pairs by spatial cross correlation is described. Therefore the theory and notation developed by Adrian (Adrian, R. J. 1988: Statistical properties of particle image velocimetry measurements in turbulent flows. Laser Anemometry in Fluid Mechanics III. ed. R. J. Adrian, T. Asanuma, D. F. G. Durao, F. Durst and J. H. Whitelaw, pp. 115–129) and by Keane and Adrian (Keane, R. D., Adrian, R. J. 1990: Optimization of particle image velocimeters. Part I: Double pulsed systems. Meas. Sci. Technol. 1, pp. 1202–1215 and Keane, R. D., Adrian, R. J. 1992: Theory of cross-correlation analysis of PIV images. Appl. Sci. Res. 49, pp. 191–215) will be used. According to these authors it is convenient to decompose the estimator for cross-correlation of single-exposure frames into three components. Each of them is a function of the two dimensional separation vector s in the correlation plane:

$$R(\underline{s}) = R_C(\underline{s}) + R_D(\underline{s}) + R_F(\underline{s}).$$

The influences considered by this decomposition are the convolution of the mean intensities $R_C(\underline{s})$, the fluctuating noise component $R_F(\underline{s})$ (generated by images of distinct particles) and the correlation peak giving the image displacement $R_D(\underline{s})$ of identical particles. The basis of the evaluation procedure we used is the fact that the strength of the displacement peak $R_D(\underline{s})$ is proportional to the number of image pairs in the correlation windows. The assumption of a sufficiently low variance of the velocit), within each interrogation cell leads to the following simplified model:

$$R_D(\underline{s}) = F_1(\underline{s}_D, \underline{x}_i, \underline{x}_{i+1}, \Delta x, \Delta y) \cdot F_0(w \Delta t, z_{i+1} - z_i, \Delta z_0) \cdot F_t(\underline{s} - \underline{s}_D) \cdot K.$$

$F_1(\underline{s}_D, \underline{x}_{i+1}, \Delta x, \Delta y)$ describes the decrease by the fraction of second images lost by in-plane motion as a function of the particle image displacement $\underline{s}_D$, the size of the interrogation windows $\Delta x$, $\Delta y$, and the location of both interrogation windows $\underline{x}_i$, $\underline{x}_{i+1}$. The influence of the fraction of second images lost by out-of-plane motion is considered by $F_o(w \Delta t, z_{i+1} - z_i, \Delta z_0)$ which is a function of the out-of-plane particle displacement war and the shift of the light sheets in z-direction $z_{i+1} - z_i$ and their thickness $\Delta z_0$. The assumption of a constant intensity distribution of the light sheets in z-direction yields:

$$F_{O,0,1}(w \Delta t, \Delta z_0) = \frac{n_{0,1}}{n_0} = 1 - \frac{w \Delta t}{\Delta z_0}$$

for the case of the same light sheet location, mad $$F_{O,1,2}(w \Delta t, \Delta z_0, z_2 - z_1) = \frac{n_{1,2}}{n_0} = O_z + \frac{w \Delta t}{\Delta z_0}$$

for the case of different light sheet locations. $F_\tau(\underline{s} - \underline{s}_D)$ is the convolution of the particle image intensity distributions. The effects of other parameters on the displacement peak (e.g., particle concentration, light intensity and magnification) are combined together in K.

In order to use the height of the correlation peak $R(\underline{s}_D)$ as an indicator for the loss of particle image pairs due to out-of-plane motion $1 - F_0(w \Delta t, z_{i+1} - z_i, \Delta z_0)$, the influence of other parameters has to be reduced. To eliminate the convolution $R_C(\underline{s})$, the mean intensities can be subtracted in each interrogation window. The fluctuating noise $R_F(\underline{s})$ is the main source of error and cannot be reduced easily. A problem arises after computing the correlation of images of tracer particles within the same light sheet $R_{0,1}(\underline{s})$ and within different light sheets $R_{1,2}(\underline{s})$. The peak position found in two different correlation planes might not be the same. To be sure that the maximum of the fluctuating noise $R_{F, max}$ is not used, the location $\underline{s}_D$ for the comparison of the peak heights can be determined by analyzing the correlation plane $R_{i,i+1}(\underline{s})$, which has the better signal-to-noise ratio.

The effects of other parameters can be reduced as follows: $R_D(\underline{s})$ has to be divided by the square root of the product of the autocorrelation peaks of both interrogation windows. In order to minimize $F_1(\underline{s}_D, \underline{x}_i, \underline{x}_{i+1}, \Delta x, \Delta y)$, the window positions or sizes can be adapted as described in the previous section. In the presence of strong velocity gradients the peak strength should be analyzed using the peak volume. This can be done either by computing the sum of all grey values contained in the peak or by analyzing a fitted profile when dealing with low resolution PIV.

In our feasibility stud), we estimated the out-of-plane velocity component by using the correlation peak height of images of tracer particles in the same light sheet $R_{0,1}(\underline{s}_D)$ and of images of tracer particles in different light sheets $R_{1,2}(\underline{s}_D)$ to approximate $$\frac{n_{0,1}}{n_0} \text{ and } \frac{n_{1,2}}{n_0}:$$

$$w = \frac{\Delta z}{\Delta t} \frac{R_{1,2}(\underline{s}_D) - O_z R_{0,1}(\underline{s}_D)}{R_{1,2}(\underline{s}_D) + R_{0,1}(\underline{s}_D)}, \quad (5)$$

if $0 \leq w \Delta t \leq (z_2 - z_1)$.

We eliminated two of the above-mentioned effects by subtracting the mean intensity of the interrogation window and by normalizing the correlation peak height with the square root of the product of the autocorrelation peaks. Therefore, the following simplifications are implied in formula (5):

(1) A constant intensity of the light sheet in z-direction has been assumed instead of a Gaussian distribution. In complete terms $F_0(w \Delta t, \Delta z_0, z_{i+1} - z_i, \Delta z_0)$ is the normalized correlation of the intensity distributions of two successive light pulses in z-direction. Therefore, the Gaussian function $F_0(w\Delta t, \Delta z_0, z_{i+1}-z_i)$ is approximated by a triangle function. (2) The effect of the variation of the displacement within the interrogated cell, and the fraction of second images lost by in-plane motion $F_1(\underline{s}_D, \underline{x}_i, \underline{x}_{i+1}, \Delta x, \Delta y)$ is assumed to be identical for both correlations. This is only a rough approximation as long as the frames $f_1$ and $f_2$ are not captured at the same time. (3) The fluctuating noise component $R_F(\underline{s})$ is neglected. Its effect on the measurement accuracy can be reduced by averaging results over neighboring interrogation cells. However, this has to be balanced against a decrease in spatial resolution.

To obtain a first impression of the properties of the velocity estimation given in equation (5) we performed a simple numerical simulation. The locations of particle images in three frames $f_0$, $f_1$ and $f_2$ were computed based on a random distribution of particles moving with a varying velocity $u=(0, 0, w=(4.2x/x_{max})\Delta z_0/\Delta t)$. The w-component of the particle velocity is shown as a line in FIG. 4. The overlap of the light sheets at $t=t_0+\Delta t$ and $t=t_0 2\Delta t$ was set to $O_z=0.17\Delta z$. Each dot in FIG. 6 represents a grid point of the velocity field. The averages of the velocity values obtained by our method are showing linear behavior. The noise contained in our evaluation can also clearly be seen.

In our experiments we observed particles in a vortex ring flow using a frame-transfer CCD-video camera and the standard DPIV equipment developed by the research group of Prof. Mory Gharib. Glass-spheres with a diameter of 10 μm were mixed with water in a plexiglas tank. The vortex rings were generated by a 30 mm piston that pushes water out of a sharp-edged cylindrical nozzle into the surrounding fluid. The piston was driven by a linear traversing mechanism and a computer controlled stepper motor. The vortex ring experiment offers a good challenge for the presented measurement technique.

Figure 7:
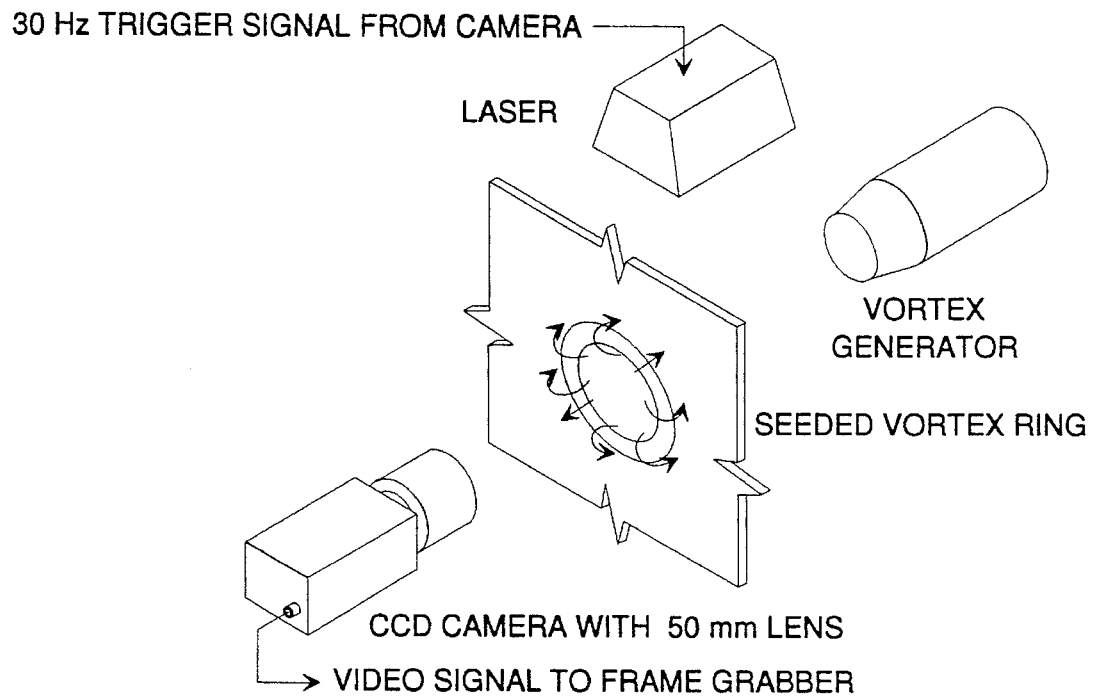
FIG. 7 shows the main components of a second embodiment of a device for contactless measurement of three dimensional flow velocities.
Figure 8:
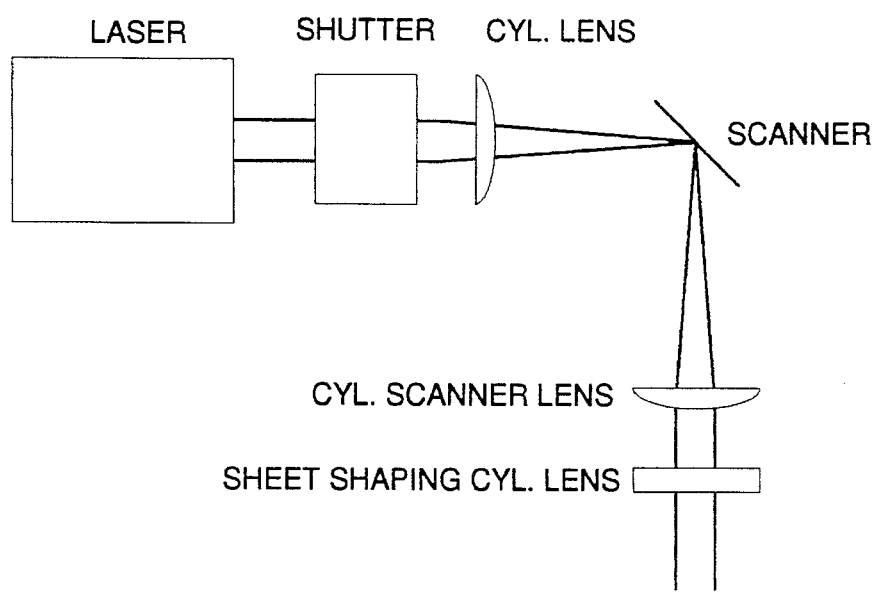
FIG. 8 shows the optical components of the device according to FIG. 7.

FIG. 7 shows the main components of the setup except the light sheet shaping optics and the electronic equipment. The arrangement of the optical and the electro-mechanical components are shown in FIG. 8 and are described below. An argon ion laser produced a continuous beam of about 6 Watt output power. An electro-mechanical shutter controlled by the DPIV timer box generated light pulses with a pulse length of $t_e=5$ ms and a pulse separation time of $\Delta t=33$ ms. The shutter was phase locked with the video camera which had a frame-transfer time of $t_f=2$ ms. The aperture of the shutter was of a size that cuts off the outer area of the laser beam of lower intensity. A computer controlled micro stepper motor with a mirror mounted to one end of the shaft was used as a scanner, which, together with the cylindrical scanner lens (see FIG. 3), generated a parallel displacement of the light sheet. An additional cylindrical lens in front of the scanner mirror focused the light onto the mirror and thus compensated for the confluencing effect of the scamper lens onto the beam. The light sheet shaping lens had a focal length small enough to generate a light sheet height that was twice as large as the height of the observation field. As a result, the variation of the light intensity was held small with respect to the observed field.

Figure 9:
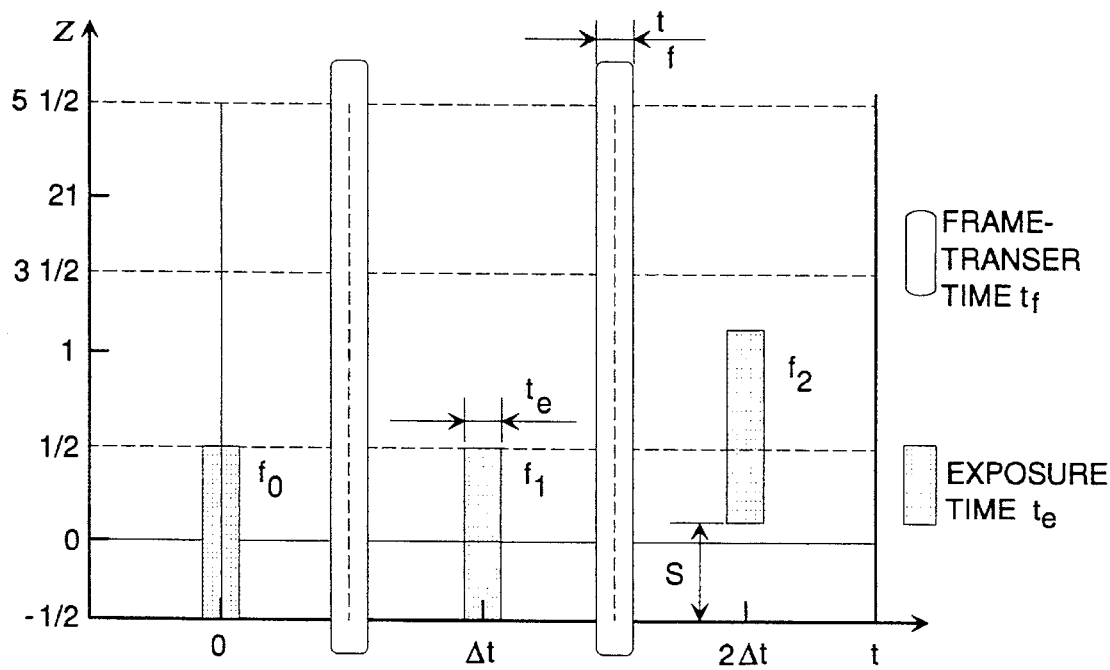
FIG. 9 is a timing diagram of the image capture.

The scanner was phase locked to the video signal of the recording camera and alternated the light sheet location after each second capture of a complete video frame (see FIG. 9). Synchronized with the motion of the piston three subsequent video frames were captured. Two frames contain images of tracer particles within the same light sheet orientated perpendicular to the vortex ring axis ($f_0$ and $f_1$ captured at $t=t_0$ and $t=t_0+\Delta t$ respectively). The third frame contains images of tracer particles within a light sheet parallel to the first one ($f_2$ captured at $t=t_0+2\Delta t$). The shift of the light sheet was $(z_2-z_1)=2.5$ mm resulting in an overlap of $O_z=17\%$ of the light sheet thickness ($\Delta z_0=3$ mm).

Figure 10:
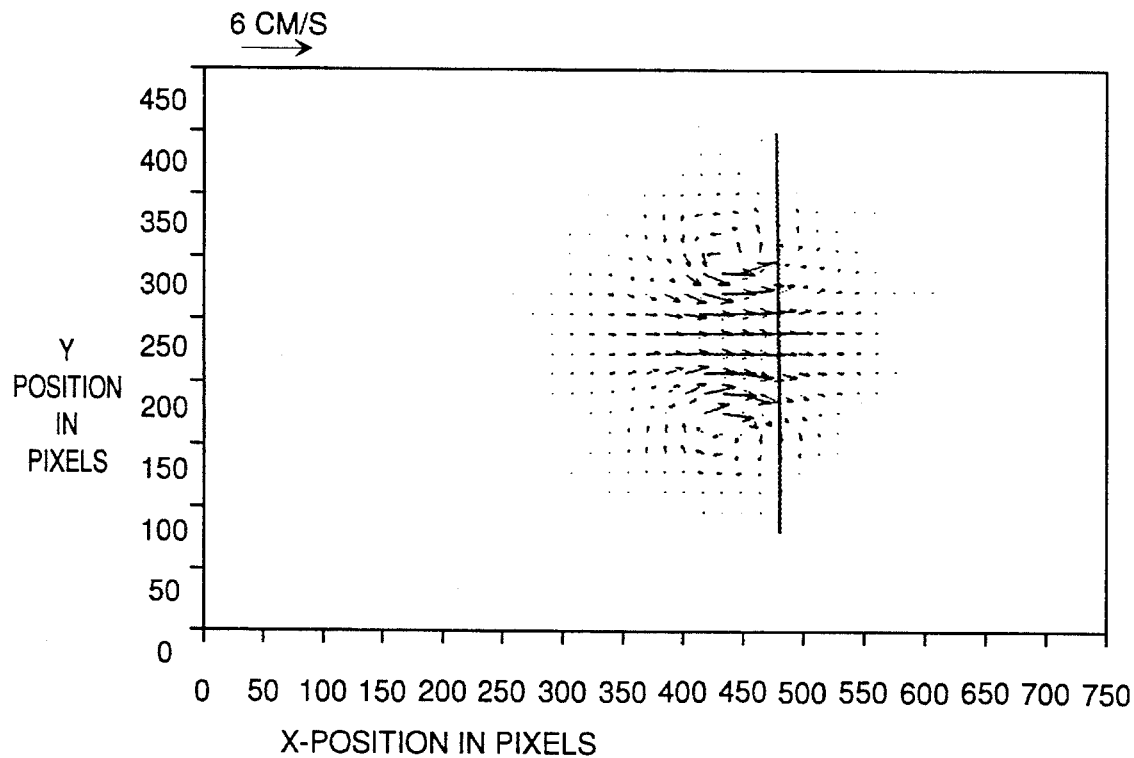
FIG. 10 shows a flow field in an intersection on the vortex ring axis.
Figure 11:
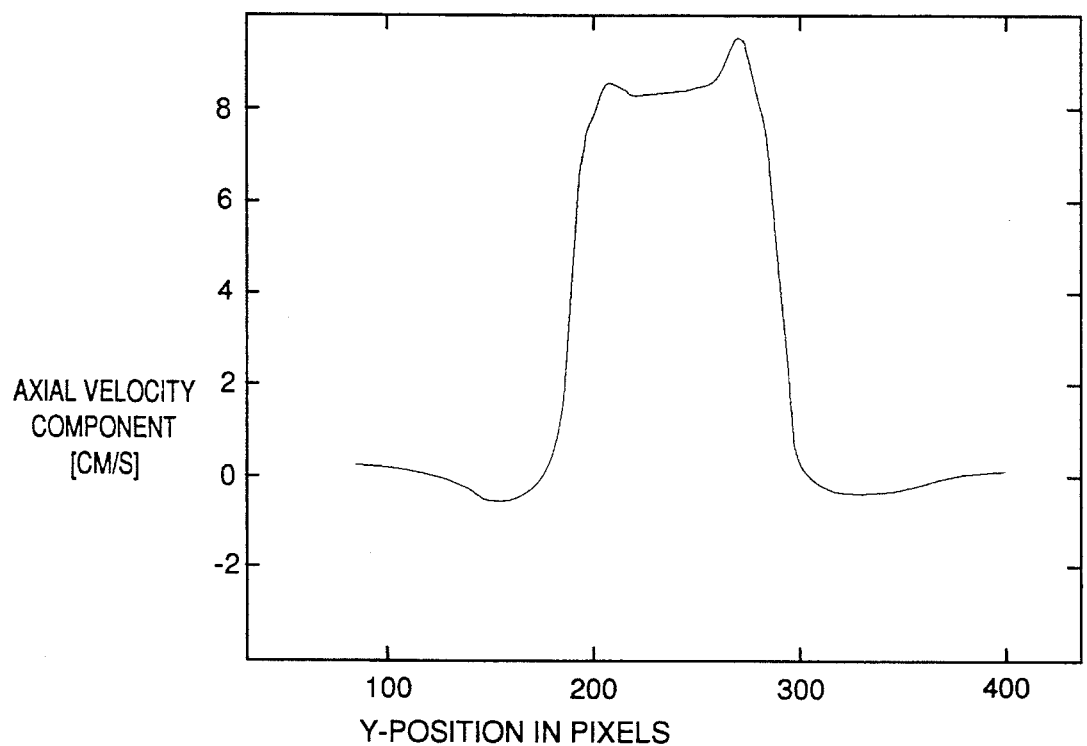
FIG. 11 shows the velocity component parallel to the vortex ring axis along the line shown in FIG. 10.

To obtain more information about the flow field generated by the setup described above we first took PIV-data along the centerline of the vortex ring (see FIG. 10). The axial components of the velocity vectors along the indicated line give information on the out-of-plane velocity component we had to expect when observing the flow field in a plane perpendicular to the vortex ring axis. The magnitude of this velocity component parallel to the ring axis is plotted in FIG. 11.

Following the described method, we then captured images of particles within two parallel light sheets onto three different frames. Both light sheet planes were orientated perpendicular to the vortex ring axis as shown in FIG. 7. The frames were evaluated detecting, the location of the stronger peak and storing the normalized intensities of both correlation planes at this location for each interrogation cell. The size of the interrogation windows was 32×32 pixels and the interrogation stepwidth in both the x- and y-direction was 16 pixels. The results of the evaluation of the frames $f_0$ and $f_1$ containing images of particles within the same light sheet show outliers in a ring near the center of the flow field (see FIG. 12). This area of low detection probability is caused by the decreased seeding density near the center of the vortex ring and by the strong out of plane motion in the center of the observed field.

Figure 12:
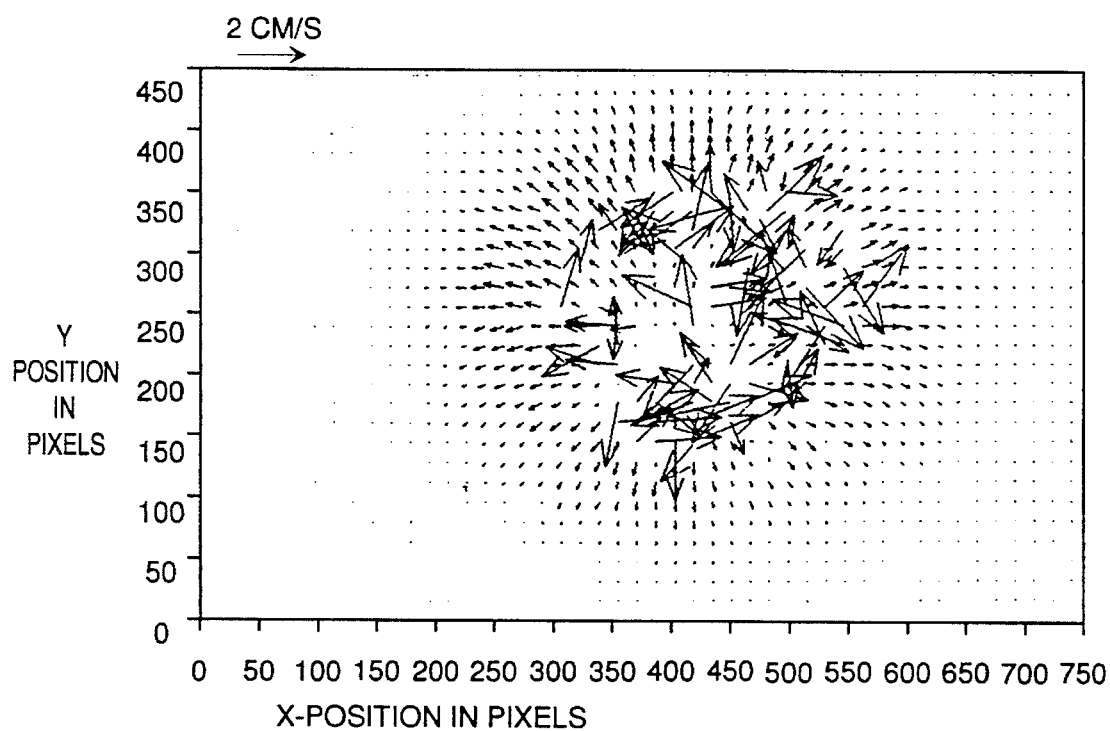
FIG. 12 is a velocity vector map obtained by images of particles illuminated by the same light sheet.

The heights of the tallest peaks in the cross correlation planes $R_{0,1}(\underline{s}_D)$ are shown in FIG. 12. They clearly show the influence of the out-of-plane velocity component.

Figure 14:
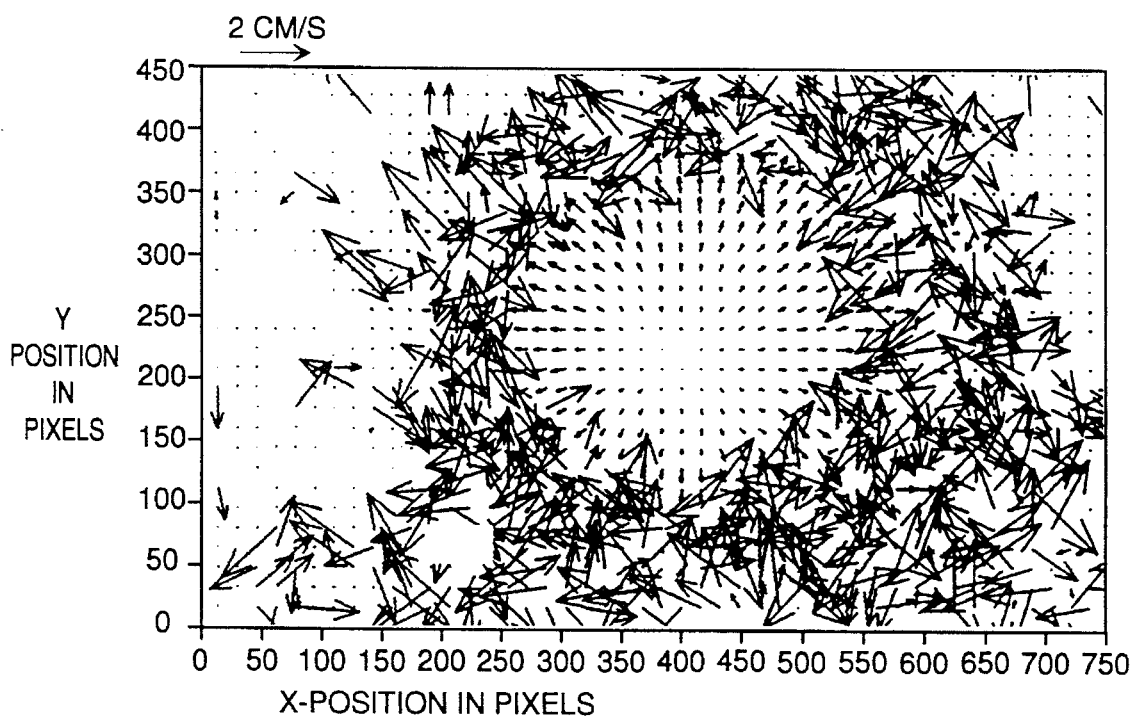
FIG. 14 is a velocity vector map obtained by images of particles illuminated by different light sheets.
Figure 15:
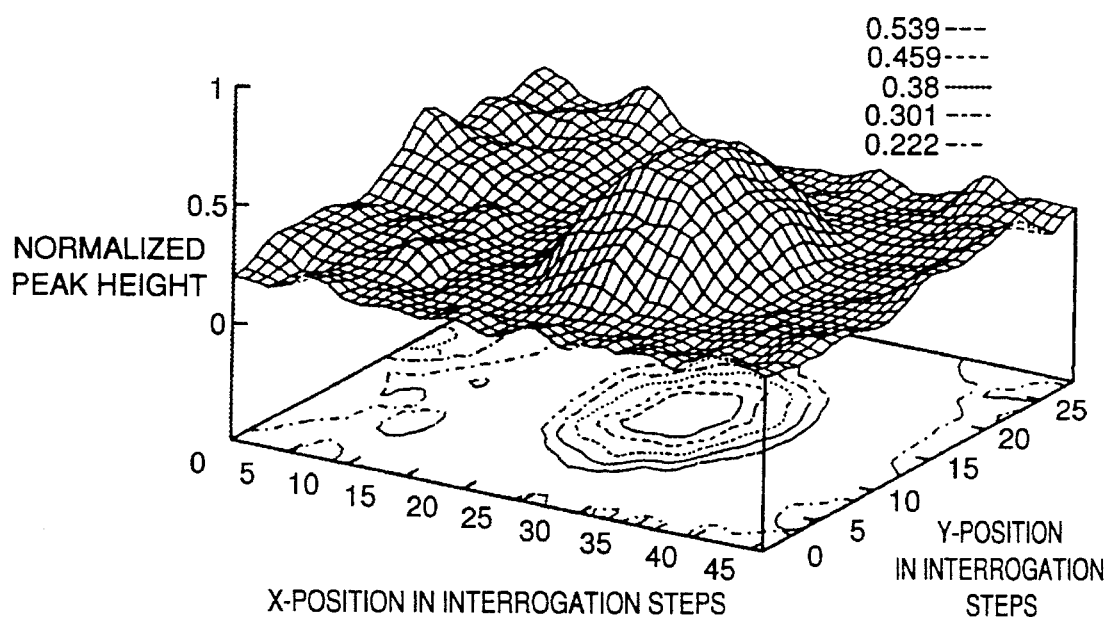
FIG. 15 shows correlation peak heights of images of particles illuminated by different light sheets smoothed by a spatial averaging (3×3 kernel).
Figure 16:
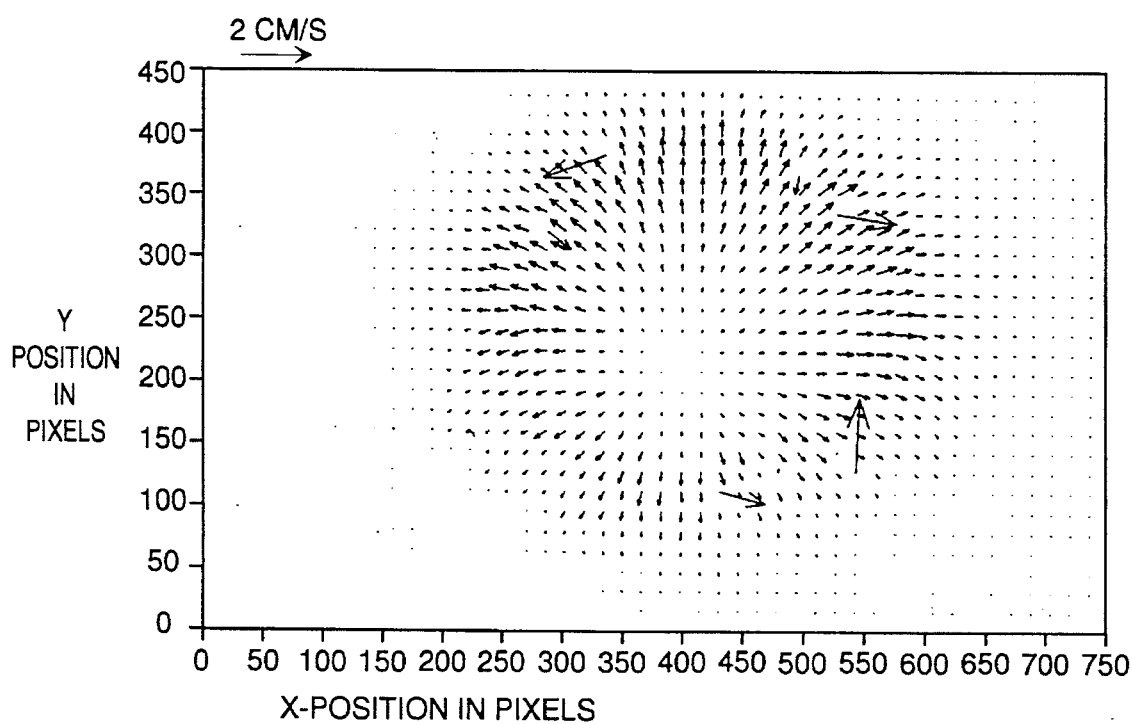
FIG. 16 is a velocity vector map obtained by considering the best result of both correlations $R_{0,1}(S_D)$ and $R_{1,2}(S_D)$ for each interrogation cell.
Figure 17:
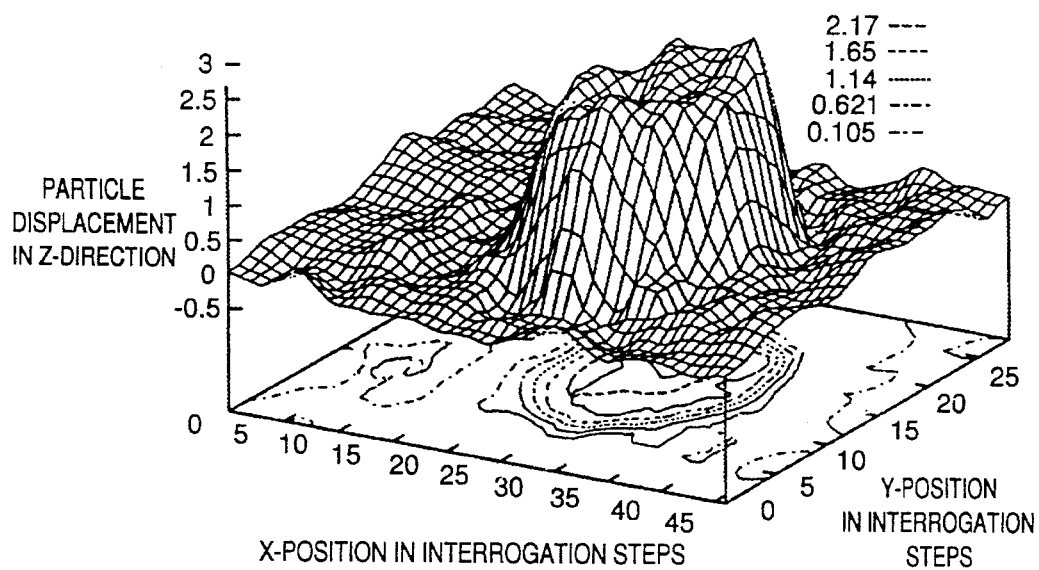
FIG. 17 shows an out-of-plane velocity distribution estimated by image pair frequency analysis smoothed by a spatial averaging (3×3 kernel ).
Figure 18:
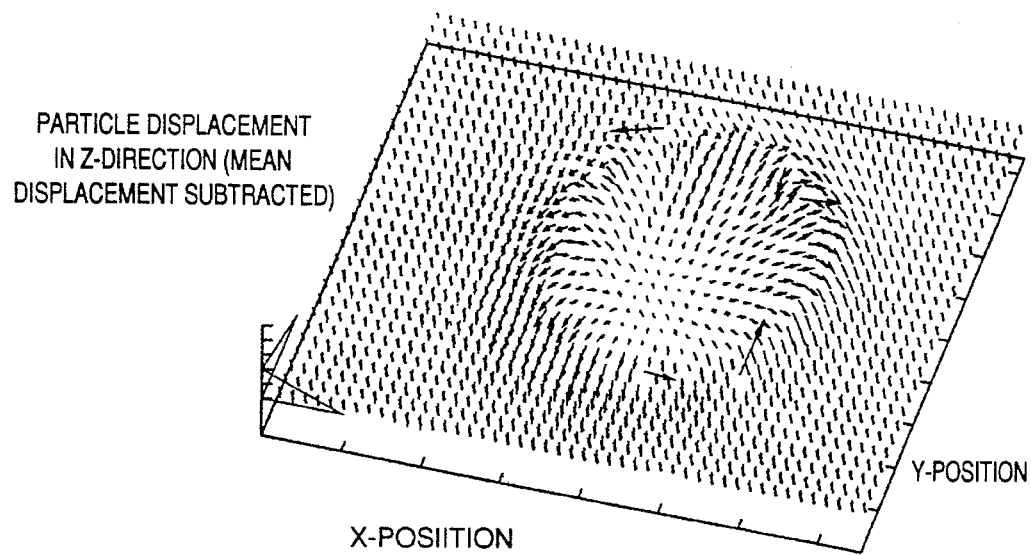
FIG. 18 is a three-dimensional representation of the velocity vectors of the observed plane (raw data without any smoothing, data validation or interpolation).

The results of the evaluation of the frames $f_1$ and $f_2$ show outliers in a ting farther outward (see FIG. 14). The values of the heights of the correlation peaks $R_{1,2}(\underline{s}_D)$ are shown in FIG. 15. In this case out-of-plane velocity components increase the correlation peak heights.

Figure 13:
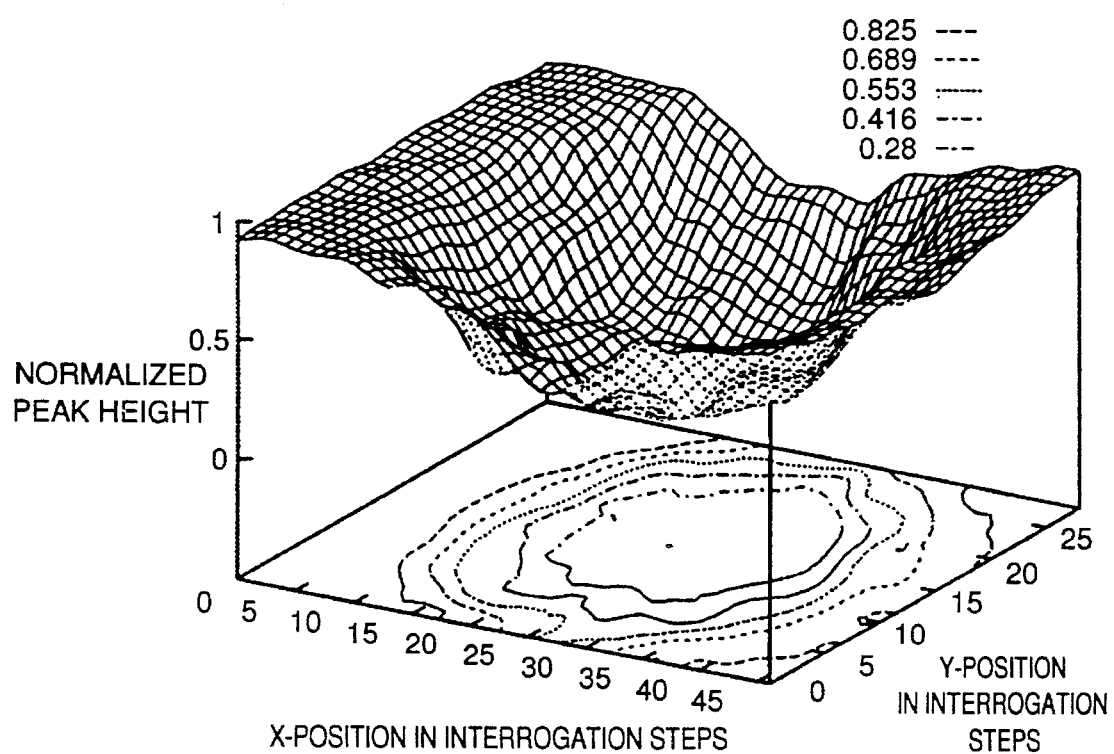
FIG. 13 shows cross correlation peak heights of images of particles illuminated by the same light sheet smoothed by a spatial averaging (3×3 kernel).

The following evaluation procedure was used to take advantage of the images captured in different planes. The intensity distributions $R_{0,1}(\underline{s}_D)$ of the correlation of the frames $f_0$ and $f_1$ and the intensity distribution $R_{1,2}(\underline{s}_D)$ of the correlation of frames $f_1$ and $f_2$ were computed and normalized. The highest peak for each interrogated cell was then used to determine the particle image displacement estimator $\underline{s}_D$. This procedure reduces the number of outliers (see FIG. 6). The peak positions found by this procedure were used to find the correct and identical location in both cross correlation planes for intensity analysis. FIG. 7 shows the plot of the out-of-plane velocity distribution computed from the intensity found in the procedure described above and according to formula (5). In contrast to the results obtained by evaluating only two frames (see FIG. 13 and FIG. 5) the expected structures of the flow can now be seen in FIG. 7. The final result is also shown in FIG. 8 in a three-dimensional representation.

LIST OF SYMBOLS

| | |
|---|---|
| C | particle density in the flow |
| $d_\tau$ | particle image diameter |
| $f_0, f_1$ | frames containing images of particles within the same light sheet at $t = t_0$ ($f_0$) and at $t = t_0 + \Delta t$ ($f_1$) |
| $f_2$ | frames containing images of particles within a light sheet parallel to the first one at $t = t_0 + 2\Delta t$ |
| $F_I$ | estimator of the loss of image pairs due to in-plane motion |
| $F_O$ | estimator of the loss of image pairs due to out-of-plane motion |
| $F_\tau$ | convolution of the particle image intensity distributions |
| K | factor containing constant parameters in the |

-continued

LIST OF SYMBOLS

| | |
|---|---|
| | correlation plane |
| M | imaging magnification (image size/object size) |
| $n_0$ | number of particles in the measurement volume at $t = t_0$ |
| $n_{0,1}$ | number of particle image pairs in $f_0$ and $f_1$ |
| $n_{1,2}$ | number of particle image pairs in $f_1$ and $f_2$ |
| $O_z$ | overlap of the light sheets |
| $R_C(\underline{s})$ | convolution of the mean intensities in each interrogation window |
| $R_D(\underline{s})$ | correlation which gives the image displacement |
| $R_F(\underline{s})$ | fluctuating noise component of the cross correlation estimator |
| $R_{0,1}(\underline{s_D})$ | peak height of the cross correlation of $f_0$ and $f_1$ |
| $R_{1,2}(\underline{s_D})$ | peak height of the cross correlation of $f_1$ and $f_2$ |
| $\underline{s}$ | two-dimensional separation vector in the correlation plane |
| $\underline{s_D}$ | mean particle image displacement in the interrogation cell |
| $t_e$ | light pulse length |
| $t_f$ | frame-transfer time of the video camera |
| $\underline{u}$ | three-dimensional velocity vector (u, v, w) |
| $\underline{x_1}$ | position of the center of an interrogation volume in the flow |
| $(z_2 - z_1)$ | displacement of the light sheets in z-direction |
| $\Delta t$ | separation time of the light pulses |
| $\Delta x_0$ | x-extension of an interrogation volume |
| $\Delta y_0$ | y-extension of an interrogation volume |
| $\Delta z_0$ | light sheet thickness |

LIST OF REFERENCE CHARACTERS

| | |
|---|---|
| 1 | Pulsed Laser |
| 2 | Light Sheet Optic |
| 3 | Laser Beam |
| 4 | Laser Beam |
| 5 | Partial Volume |
| 6 | Partial Volume |
| 7 | Tracer Particle |
| 8 | Projection optic |
| 9 | Photo Sensor |
| 10 | Photo Sensor |
| 11 | Beam Splitter |
| 12 | Polarization Filter |
| 13 | Polarization Filter |
| 14 | Optical Axis |

We claim:

1. A method for the contactless measurement of three dimensional flow velocities, said method comprising the steps of:

seeding a flow with a plurality of tracer particles;

repeatedly illuminating a plane-like interrogation volume of the seeded flow;

projecting the repeatedly illuminated interrogation volume onto at least one photo sensor in a projection direction for recording pictures of the illuminated interrogation volume; and determining the three dimensional flow velocities from the pictures of the repeatedly illuminated interrogation volume recorded by the at least one photo sensor;

providing at least two partial volumes positioned parallel to each other with respect to the projection direction of said interrogation volume as a part thereof;

wherein the step of repeatedly illuminating the interrogation volume includes the step of illuminating said partial volumes in such a way that the pictures of said partial volumes are distinguishable from each other; and wherein the step of determining the three dimensional flow velocities of the flow includes the steps of calculating a local autocorrelation function of a double exposed picture of the same partial volume, calculating a local cross-correlation function between two pictures of said at least two partial volumes, determining the sign of the out-of-plane component of the local flow velocities by using the location of a peak of the local cross-correlation function between the two pictures of said at least two partial volumes, and determining the magnitude of the out-of-plane component of the local flow velocities by using the peak heights of peaks of both local correlation functions.

2. The method of claim 1, wherein the step of illuminating the partial volumes includes the step of illuminating said at least two partial volumes at different points of time with respect to one another, and the step of projecting the survey volume onto the at least one photo sensor of the pictures of said partial volumes includes the step of separately recording the pictures one after the other.

3. The method of to claim 2, wherein the step of projecting the interrogation volume includes the step of using a separate photo sensor for each one of said at least two partial volumes, each said photo sensor being synchronized with the illumination of one of said partial volumes, respectively.

4. The method of claim 1, wherein the step of illuminating the partial volumes includes the step of using different kinds of light distinguishable from one another.

5. The method of claim 4, wherein the step of projecting the interrogation volume includes the step of using separate photo sensors selectively sensible for at least one of the different kinds of light used.

6. The method of claim 4, including the step of distinguishing the different kinds of light from one another by their polarization.

7. The method of claim 1, including the step of sizing the partial volumes of the interrogation volume to have the same size.

8. The method of claim 1, including the step of partially overlapping the partial volumes of the interrogation volume with respect to one another.

9. The method of claim 8, wherein the step of partially overlapping the partial volumes of the interrogation volume includes the step of overlapping said partial volumes by approximately 50% with respect to one another.

10. A method for the contactless measurement of three dimensional flow velocities, said method comprising the steps of:

seeding a flow with a plurality of tracer particles;

repeatedly illuminating a plane-like interrogation volume of the seeded flow;

projecting the repeatedly illuminated interrogation volume onto at least one photo sensor in a projection direction for recording pictures of the illuminated interrogation volume;

determining the three dimensional flow velocities from the pictures of the repeatedly illuminated interrogation volume recorded by the photo sensor;

providing at least two partial volumes positioned parallel to one another with respect to the projection direction of said interrogation volume as a part thereof;

wherein the step of repeatedly illuminating the interrogation volume includes the step of illuminating said partial volumes in such a way that the pictures of said partial volumes are distinguishable from each other; and wherein the step of determining the three dimensional flow velocities of the flow includes the steps of calculating a local cross-correlation function between two separate pictures of the same partial volume; calculating a local cross-correlation function between two pictures of said at least two partial volumes, determining the sign of the out-of-plane component of the local flow velocities by using the location of a peak of the local cross-correlation function between the two pictures of said at least two partial volumes, and determining the magnitude of the out-of-plane component of the local flow velocities by using the peak heights of peaks of both local correlation functions.

11. The method of claim 10, wherein the step of illuminating said partial volumes includes the step of illuminating said partial volumes at different points of time with respect to one another, and the step of projecting the survey volume onto the at least one photo sensor includes the step of separately recording the pictures of the different partial volumes one after the other.

12. The method of claim 11, wherein the step of projecting the interrogation volume includes the step of using a separate photo sensor for each one of said at least two partial volumes, each said photo sensor being synchronized with the illumination of one of said partial volumes, respectively.

13. The method of claim 10, the step of illuminating said partial volumes including the step of using different kinds of light distinguishable from one another.

14. The method of claim 13, wherein the step of projecting the interrogation volume includes the step of using separate photo sensors selectively sensible to at least one of the different kinds of light used.

15. The method of claim 13, further comprising the step of distinguishing the different kinds of light by polarization.

16. The method of claim 10, including the step of sizing said partial volumes to have the same size.

17. The method of claim 10, further comprising the step of partially overlapping said partial volumes of the interrogation volume with respect to one another.

18. The method of claim 17, further including the step of partially overlapping said partial volumes by approximately 50% with respect to one another.

* * * * *